US011265524B2

(12) United States Patent
Nakada

(10) Patent No.: US 11,265,524 B2
(45) Date of Patent: Mar. 1, 2022

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yuichi Nakada, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/071,864

(22) Filed: Oct. 15, 2020

(65) Prior Publication Data

US 2021/0127103 A1 Apr. 29, 2021

(30) Foreign Application Priority Data

Oct. 23, 2019 (JP) ............................ JP2019-192719

(51) Int. Cl.

*H04N 9/73* (2006.01)
*H04N 5/222* (2006.01)
*H04N 5/235* (2006.01)
*H04N 9/64* (2006.01)
*H04N 9/68* (2006.01)

(52) U.S. Cl.

CPC ........... *H04N 9/735* (2013.01); *H04N 5/2224* (2013.01); *H04N 5/2354* (2013.01); *H04N 9/643* (2013.01); *H04N 9/68* (2013.01)

(58) Field of Classification Search

CPC ..................................................... H04N 9/735
USPC ...................................................... 348/223.1
See application file for complete search history.

(56) References Cited

U.S. PATENT DOCUMENTS

2016/0335745 A1* 11/2016 Tajima .................... G06T 5/008

FOREIGN PATENT DOCUMENTS

JP 2016-213718 A 12/2016

* cited by examiner

*Primary Examiner* — Joel W Fosselman
(74) *Attorney, Agent, or Firm* — Canon U.S.A., Inc. IP Division

(57) ABSTRACT

An apparatus configured to correct a captured image using a gloss component based on a virtual light source sets a light-source color of the virtual light source. The apparatus generates the gloss component on a subject in the captured image using the light-source color corrected according to a color tone of the captured image. The apparatus corrects the captured image by adding the generated gloss component to the captured image.

18 Claims, 12 Drawing Sheets

COLOR IMAGE DATA $I(i,j) = (I_r(i,j), I_g(i,j), I_b(i,j))$

DISTANCE IMAGE DATA $D(i,j)$

NORMAL IMAGE DATA $N(i,j) = (N_x(i,j), N_y(i,j), N_z(i,j))$

IMAGE PROCESSING APPARATUS, IMAGE PROCESSING METHOD, AND STORAGE MEDIUM

BACKGROUND OF THE DISCLOSURE

Field of the Disclosure

The aspect of the embodiments relates to image processing for changing a color tone of a captured image.

Description of the Related Art

In photography, lighting is one of major factors that determine an impression of a subject. For example, although the subject conveys a flat impression under some lighting, this impression can be changed to convey a three-dimensional impression by adjusting the lighting to add an appropriate gloss to the subject. As a method for changing the lighting in a pseudo manner by image processing, Japanese Patent Application Laid-Open No. 2016-213718 discusses detecting an attribute of a partial region of a subject, generating a gloss component to add to the partial region according to the attribute, and correcting a glossy appearance of the partial region using the generated gloss component.

The image processing apparatus discussed in Japanese Patent Application Laid-Open No. 2016-213718, however, fails to take into consideration a behavior when the color tone of the entire image is changed. In a case where the color tone of the entire image is corrected by changing, for example, white balance settings, it may become necessary to separately adjust the color tone of the gloss component. Further, in a case the color tone of the entire image is corrected separately after the gloss component is corrected, it becomes difficult to adjust the gloss component after the color tone is corrected. Because of the lack of consideration as described above, changing the color tone of the entire image may undesirably lead to creation of an image evoking a feeling of strangeness.

SUMMARY OF THE DISCLOSURE

According to an aspect of the embodiments, an apparatus includes a setting unit configured to set a light-source color of a virtual light source, a generation unit configured to generate a gloss component on a subject in a captured image using the light-source color corrected according to a color tone of the captured image, and a correction unit configured to correct the captured image by adding the generated gloss component to the captured image.

Further features of the disclosure will become apparent from the following description of exemplary embodiments with reference to the attached drawings.

DESCRIPTION OF THE EMBODIMENTS

An exemplary embodiment of the disclosure will now be described in detail with reference to the drawings. It should be noted that the relative arrangement of the components, the numerical expressions and numerical values set forth in these embodiments do not limit the scope of the disclosure unless it is specifically stated otherwise. In the following description, exemplary embodiments of the disclosure will be described with reference to the drawings.

An imaging apparatus having an image processing apparatus according to a first exemplary embodiment will be described.

<Outer Appearance of Imaging Apparatus>

Figure 1A:
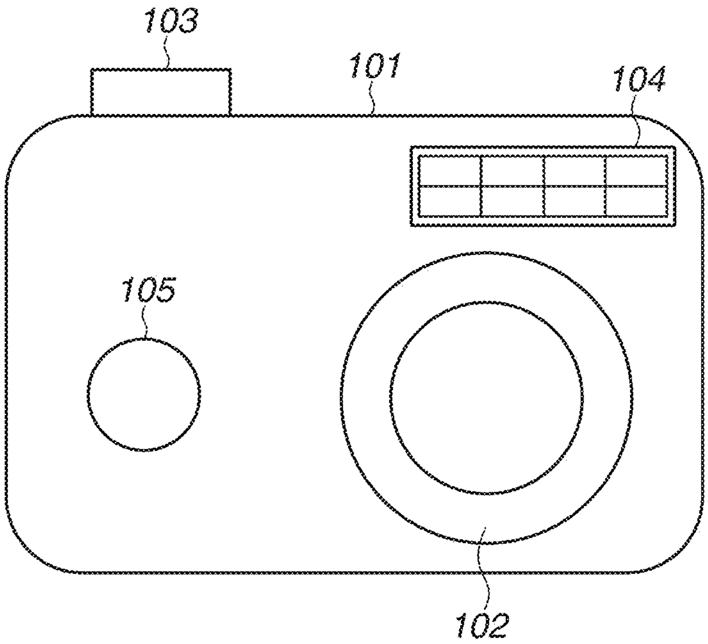
FIGS. 1A and 1B each illustrate an outer appearance indicating an example of an imaging apparatus according to a first exemplary embodiment.
Figure 1B:
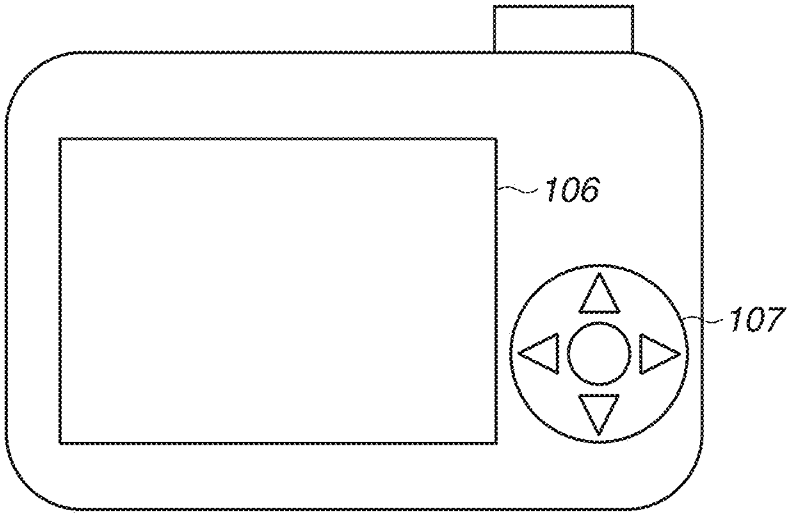

FIGS. 1A and 1B each illustrate an outer appearance indicating an example of an imaging apparatus having an image processing apparatus according to the present exemplary embodiment. FIG. 1A illustrates an outer appearance of a front side of the imaging apparatus. FIG. 1B illustrates an outer appearance of a back side of the imaging apparatus. An imaging apparatus 101 includes an optical unit 102, an imaging button 103, an electronic flash unit 104, a distance image acquisition unit 105, a display unit 106, and an operation button 107.

The optical unit 102 is a lens barrel including a zoom lens, a focus lens, a blur correction lens, a diaphragm, and a shutter. The optical unit 102 collects light information of a subject. The imaging button 103 is a button used by a user to instruct the imaging apparatus 101 to start imaging. The electronic flash unit 104 is an illumination that can emit light in synchronization with a start of an imaging performed by the imaging apparatus 101 according to an instruction of the user.

The distance image acquisition unit 105 acquires distance image data of the subject according to an imaging instruction. The distance image data is image data storing therein, as a pixel value of each pixel in the image, a subject distance corresponding to the pixel. The distance image acquisition unit 105 includes an infrared light emission unit configured to emit infrared light, and a light reception unit configured to receive the infrared light reflected from the subject. The distance image acquisition unit 105 calculates a distance value from the imaging apparatus 101 to the subject based on a time taken until the emitted infrared light is reflected by the subject and received by the light reception unit. The distance image acquisition unit 105 calculates positional information of the subject based on distance imaging information including the calculated distance value, the number of sensor pixels in the light reception unit, and the angle of view, thereby generating the distance image data. The method for acquiring the distance image data is not limited thereto. For example, the distance image data can also be acquired by providing an optical system similar to the optical unit 102 instead of the distance image acquisition unit 105 and calculating triangulation based on a parallax between pieces of image data captured from different two viewpoints.

The display unit 106 is a display device, such as a liquid-crystal display, configured to display image data processed by the imaging apparatus 101 and other various kinds of data. In a case where the imaging apparatus 101 is not equipped with an optical viewfinder like the example illustrated in FIGS. 1A and 1B, a framing operation (e.g., focusing and confirmation of a composition) is performed using the display unit 106. In other words, in the case of the imaging apparatus 101, the image is captured while a live view image is checked on the display unit 106. Thus, the display unit 106 also functions as an electronic viewfinder when an operation, such as framing and focusing, is performed. The display unit 106 can also display a camera setting menu screen, a development parameter setting screen, and other screens thereon.

The operation button 107 is a button used for the user to instruct the imaging apparatus 101 regarding, for example, an operation of switching an operation mode of the imaging apparatus 101, and an imaging parameter. The imaging apparatus 101 includes, as one of operation modes, a lighting correction processing mode of correcting a glossy appearance in the captured image after the imaging. By using the operation button 107 or the imaging button 103, the user can, for example, switch the operation mode to the lighting correction processing mode, and set illumination parameters of virtual illumination for use in the lighting correction processing. The display unit 106 can have a touch screen function, and a user instruction using this touch screen can be handled as an input on the operation button 107.

<Internal Configuration of Imaging Apparatus>

Figure 2:
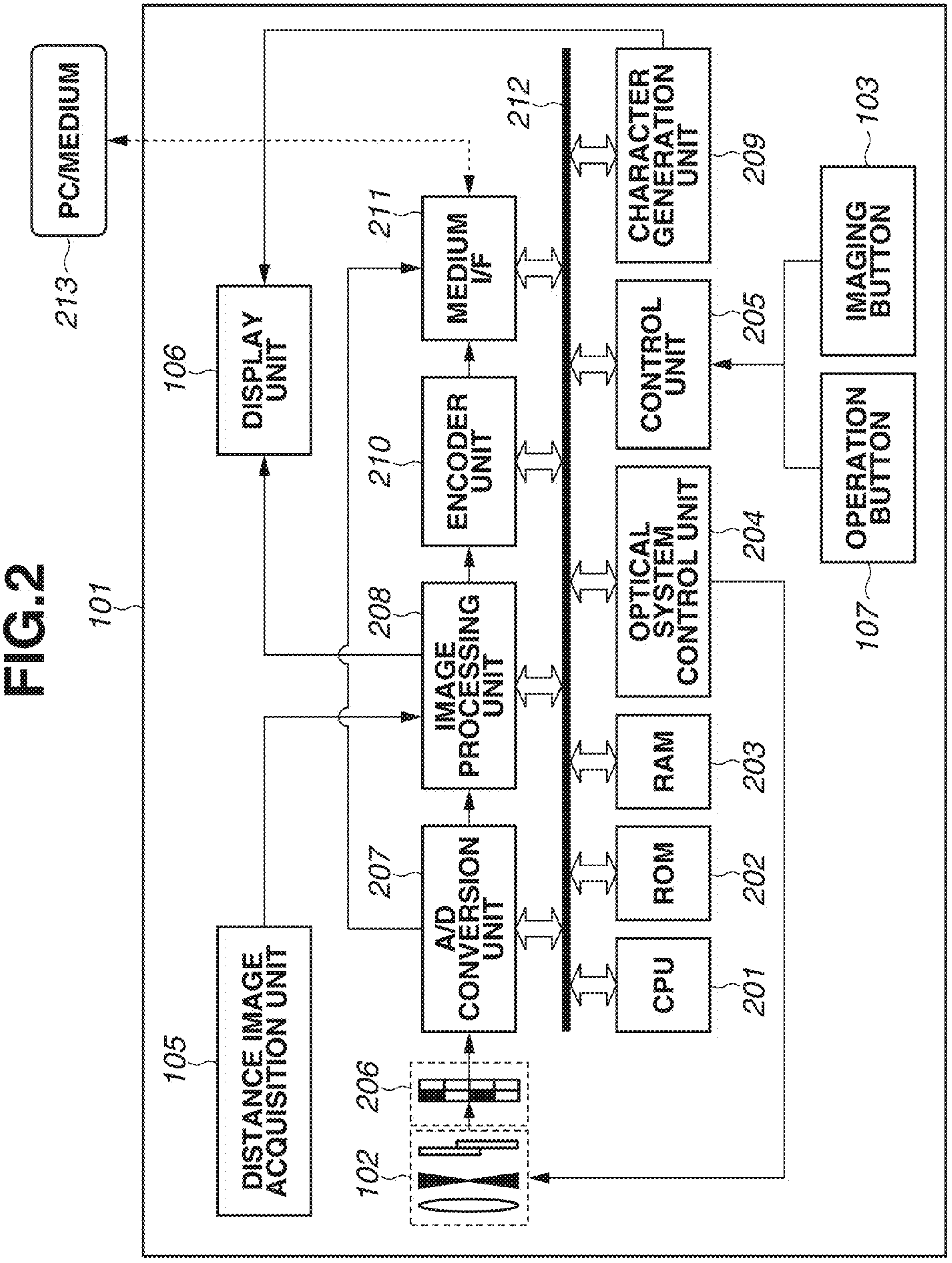
FIG. 2 illustrates an example of an internal configuration of the imaging apparatus according to the first exemplary embodiment.

FIG. 2 is a block diagram illustrating an example of an internal configuration of the imaging apparatus 101 having the image processing apparatus according to the present exemplary embodiment. A central processing unit (CPU) 201 is involved with processing performed by each constituent unit. The CPU 201 sequentially reads in commands stored in a read only memory (ROM) 202 or a random access memory (RAM) 203, interprets them, and performs the processing according to a result of the interpretation. The ROM 202 stores, for example, a program executed by the CPU 201. The RAM 203 stores, for example, a program executed by the CPU 201, and various kinds of image data.

An optical system control unit 204 is a control circuit configured to perform controls for the optical unit 102 as instructed by the CPU 201. The controls include focusing, opening the shutter, and adjusting the diaphragm. A control unit 205 is a control circuit configured to receive the user instruction from the imaging button 103 or the operation button 107. The control unit 205 controls, for example, the imaging, the switching to the lighting correction processing mode, and the setting of the illumination parameters. A color image sensor unit 206 is configured to convert the light information collected by the optical unit 102 into a current value. The color image sensor unit 206 includes a color filter having a predetermined arrangement, such as the Bayer array, and acquires color information of the subject based on the light collected by the optical unit 102.

An analog/digital (A/D) conversion unit 207 is a processing circuit configured to convert the color information of the subject detected by the color image sensor unit 206 into a digital signal value, and thereby generating RAW image data. In the present exemplary embodiment, the imaging apparatus 101 can acquire the distance image data and the RAW image data captured at a same timing. An image processing unit 208 performs development processing on the RAW image data acquired by the A/D conversion unit 207, thereby generating color image data. The image processing unit 208 also performs various kinds of image processing, such as generating corrected image data in which a lighting correction is applied to the color image data using the color image data and the distance image data.

A character generation unit 209 is a processing circuit configured to generate, for example, a character, and a graphic. The character and the graphic generated by the character generation unit 209 are superimposed on the image data or the corrected image data and displayed on the display unit 106. An encoder unit 210 converts various kinds of image data, such as RAW image data and color image data, into a predetermined file format. In the present exemplary embodiment, for example, information at the time of the imaging is stored together with the various kinds of image data. A medium interface (I/F) 211 is an interface for transmitting and receiving image data to and from a personal computer (PC)/medium 213 (e.g., a hard disk, a memory card, a CompactFlash (CF) card, and a Secure Digital (SD) card). Examples of the medium I/F 211 include Universal Serial Bus (USB). The image data received via the medium I/F 211 can be stored in the RAM 203 and subjected to various kinds of image processing by the image processing unit 208. A system bus 212 transmits and receives data.

<Configuration of Image Processing Unit>

Figure 3:
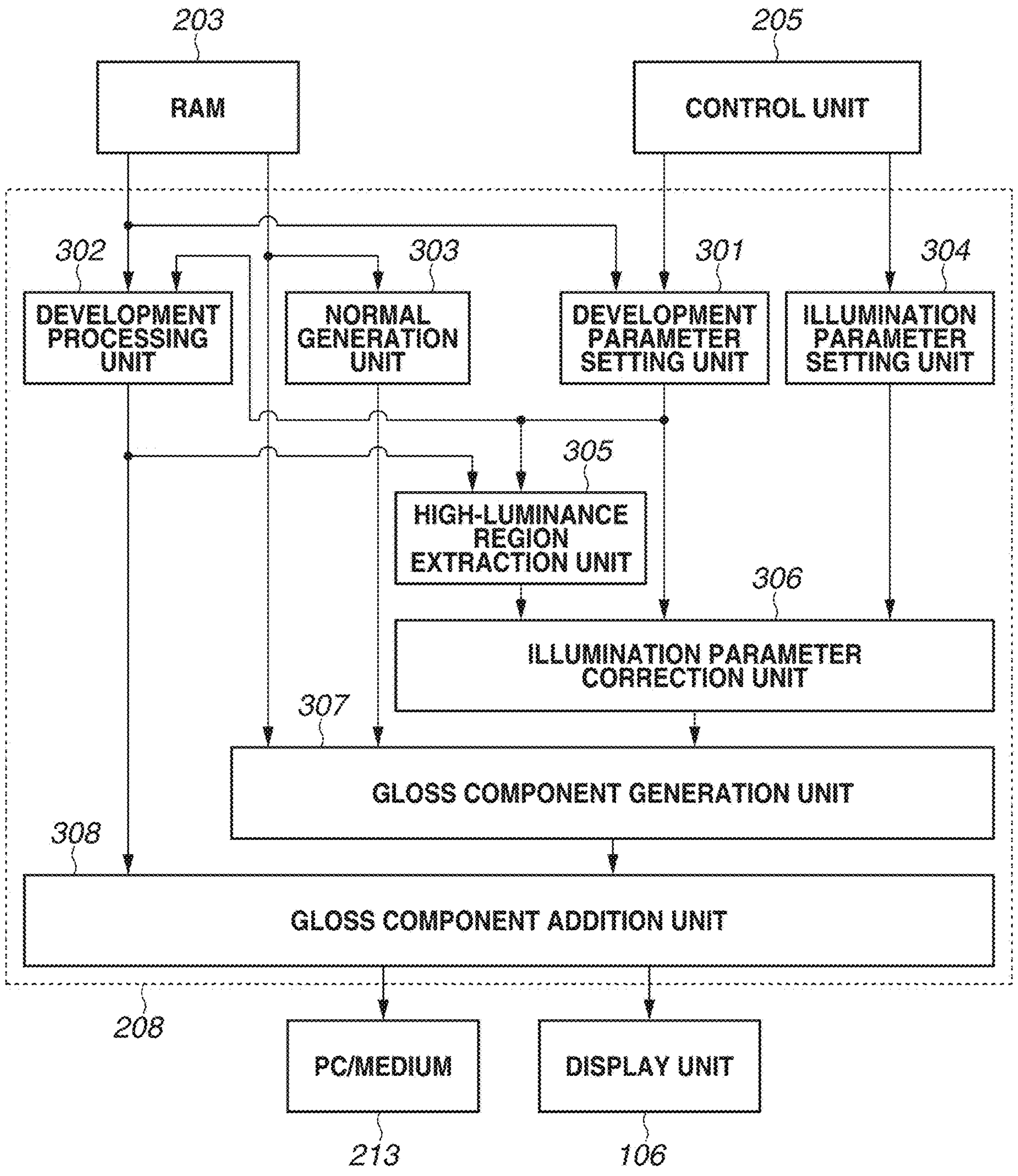
FIG. 3 illustrates an example of a functional configuration of an image processing unit according to the first exemplary embodiment.

FIG. 3 is a block diagram illustrating an example of a functional configuration of the image processing unit 208 as the image processing apparatus according to the present exemplary embodiment. A development parameter setting unit 301 sets development parameters based on the imaging information of the RAW image data acquired from the RAM 203 and information based on a user operation acquired from the control unit 205. Examples of the development parameters include parameters for white balance.

A development processing unit 302 performs development processing on the RAW image data acquired from the RAM 203 based on the development parameters set by the development parameter setting unit 301, thereby generating color image data. The development processing performed on the RAW image data includes white balance processing, demosaic processing, noise reduction processing, and color conversion processing. The generated color image data can be output and displayed onto the display unit 106 or stored in a storage device, such as the RAM 203 and the PC/medium 213.

A normal generation unit 303 generates normal image data based on the distance image data acquired from the RAM 203. An illumination parameter setting unit 304 sets illumination parameters based on information according to a user operation acquired from the control unit 205. The illumination parameters include brightness, a color, and a position of illumination. A high-luminance region extraction unit 305 extracts a region having high luminance from the color image data generated by the development processing unit 302.

An illumination parameter correction unit 306 corrects the illumination parameters set by the illumination parameter setting unit 304 based on the development parameters set by the development parameter setting unit 301 and/or the high-luminance region extracted by the high-luminance region extraction unit 305. The illumination parameter correction unit 306 corrects a color indicated by the illumination parameters based on an adjustment amount of the white balance included in the development parameters and color information of the high-luminance region.

A gloss component generation unit 307 generates gloss component image data based on the distance image data acquired from the RAM 203, the normal image data generated by the normal generation unit 303, and the illumination parameters acquired from the illumination parameter correction unit 306. The gloss component image data indicates a gloss component corresponding to the subject contained in the captured image.

A gloss component addition unit 308 generates corrected image data in which the glossy appearance of the subject in the captured image is corrected, based on the color image data acquired from the development processing unit 302 and the gloss component image data generated by the gloss component generation unit 307. The imaging apparatus 101 can output the gloss component image data and the corrected image data to, and store these data in a storage device, such as the RAM 203 and the PC/medium 213. The imaging apparatus 101 can also output the gloss component image data and the corrected image data to, and display these data on the display unit 106.

<Operation of Image Processing Unit>

Figure 4:
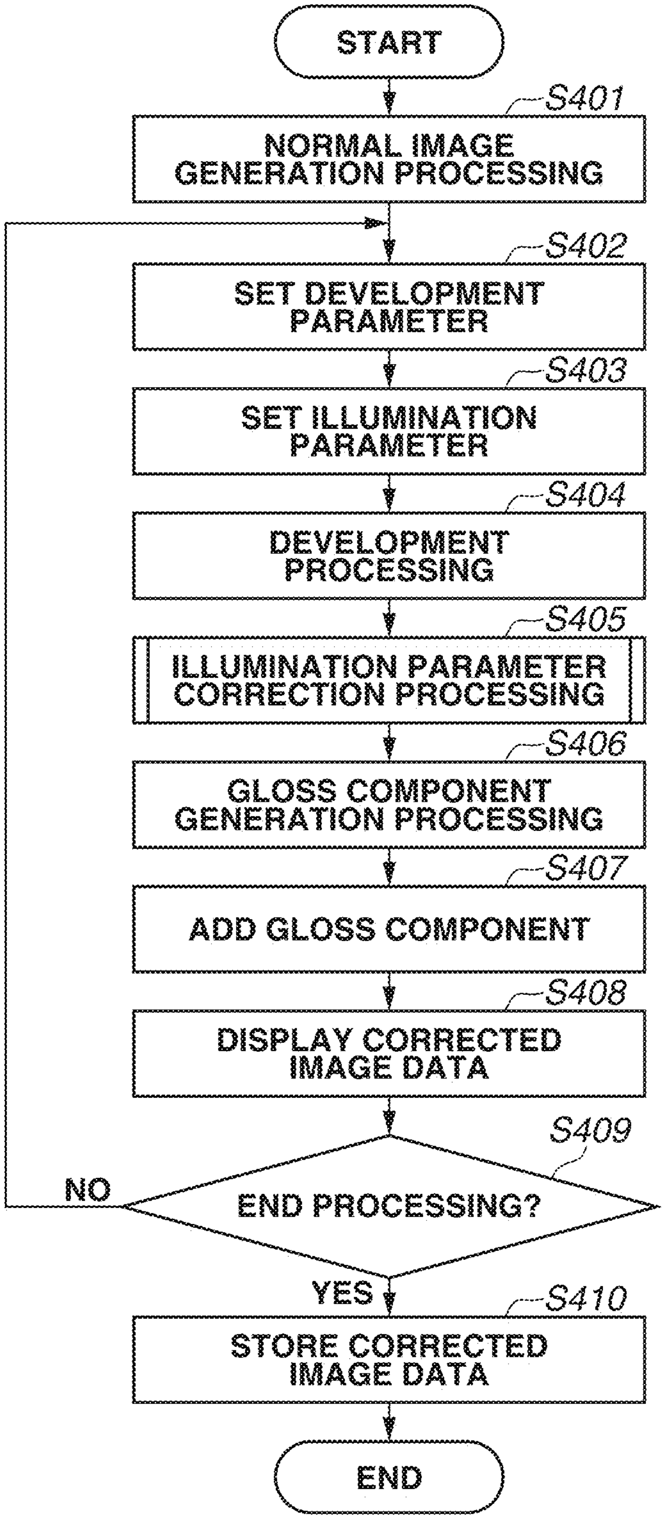
FIG. 4 is a flowchart illustrating an example of processing performed by the image processing unit according to the first exemplary embodiment.

FIG. 4 is a flowchart illustrating an example of processing performed by the image processing unit 208 according to the present exemplary embodiment. FIG. 4 illustrates an example of lighting correction processing. In the processing illustrated in FIG. 4, the image processing unit 208 generates the normal image data corresponding to the color image data. The image processing unit 208 generates the color image data by performing the development processing on the RAW image data based on the development parameters set based on the user operation or the like. The image processing unit 208 corrects the illumination parameters set through the user operation or the like based on the change amount of the white balance contained in the development parameters. The image processing unit 208 then performs the lighting correction processing on the color image data based on the distance image data, the normal image data, and the corrected illumination parameters, thereby generating the corrected image data in which the glossy appearance is corrected. The lighting correction processing according to the present exemplary embodiment includes gloss component generation processing and gloss component addition processing. In the following description, the details of the operation procedure of the image processing unit 208 will be described with reference to FIG. 4.

Figure 5A:
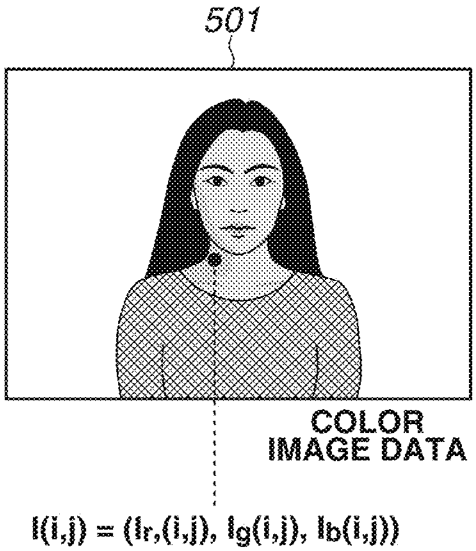
FIGS. 5A, 5B, and 5C illustrate color image data, distance image data, and normal image data, respectively.
Figure 5B:
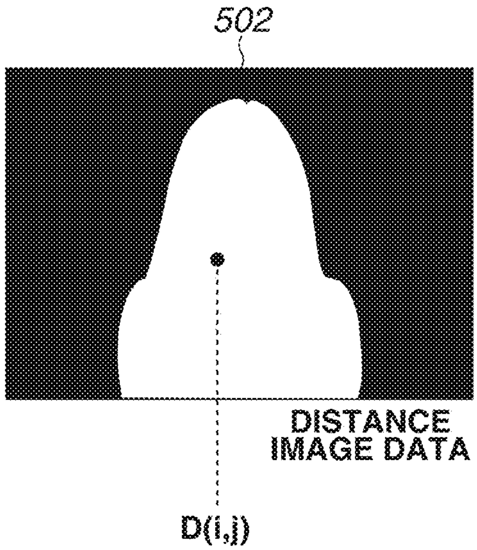
Figure 5C:
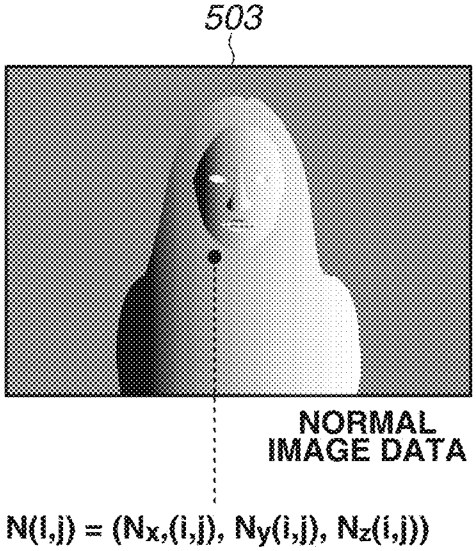

In step S401, the normal generation unit 303 generates the normal image data corresponding to the color image data based on the distance image data acquired from the RAM 203. FIGS. 5A, 5B, and 5C illustrate examples of the color image data, the distance image data, and the normal image data, respectively. RGB values are stored as pixel values in a pixel I(i, j) included in color image data I 501 illustrated in FIG. 5A. The RGB values are represented by $I_r(i, j)$, $I_g(i, j)$, and $I_b(i, j)$. A distance value D(i, j), which is a distance from the imaging apparatus 101 to the subject, is stored as a pixel value in the pixel D(i, j) included in distance image data D 502 illustrated in FIG. 5B. In the pixel N(i, j) included in normal image data N 503 illustrated in FIG. 5C, each element of a normal vector ($N_x$, $N_y$, $N_z$) is stored. The details of the normal image generation processing will be described below.

Figure 6:
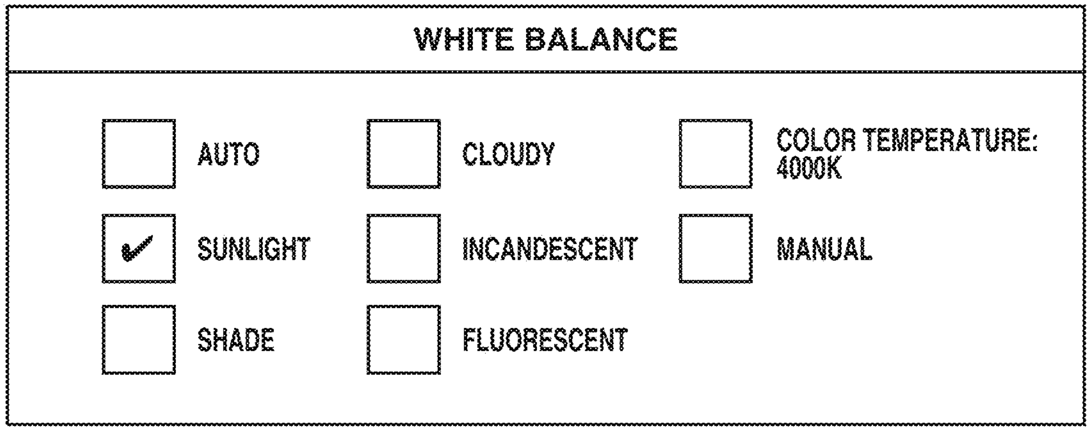
FIG. 6 illustrates an example of a development parameter setting screen.

In step S402, the development parameter setting unit 301 sets the development parameters based on the imaging information contained in the RAW image data acquired from the RAM 203 and the user operation acquired from the control unit 205. FIG. 6 illustrates an example of a screen for setting the white balance included in the development parameters according to the present exemplary embodiment. In the present exemplary embodiment, white balance values are stored in advance in the ROM 202 or the like; the white balance values correspond to various types of light sources, such as sunlight, an incandescent lamp, and a fluorescent lamp. The development parameter setting unit 301 acquires a white balance value corresponding to the light source selected based on the user operation among the various types of light sources displayed on the white balance setting screen.

Figure 7:
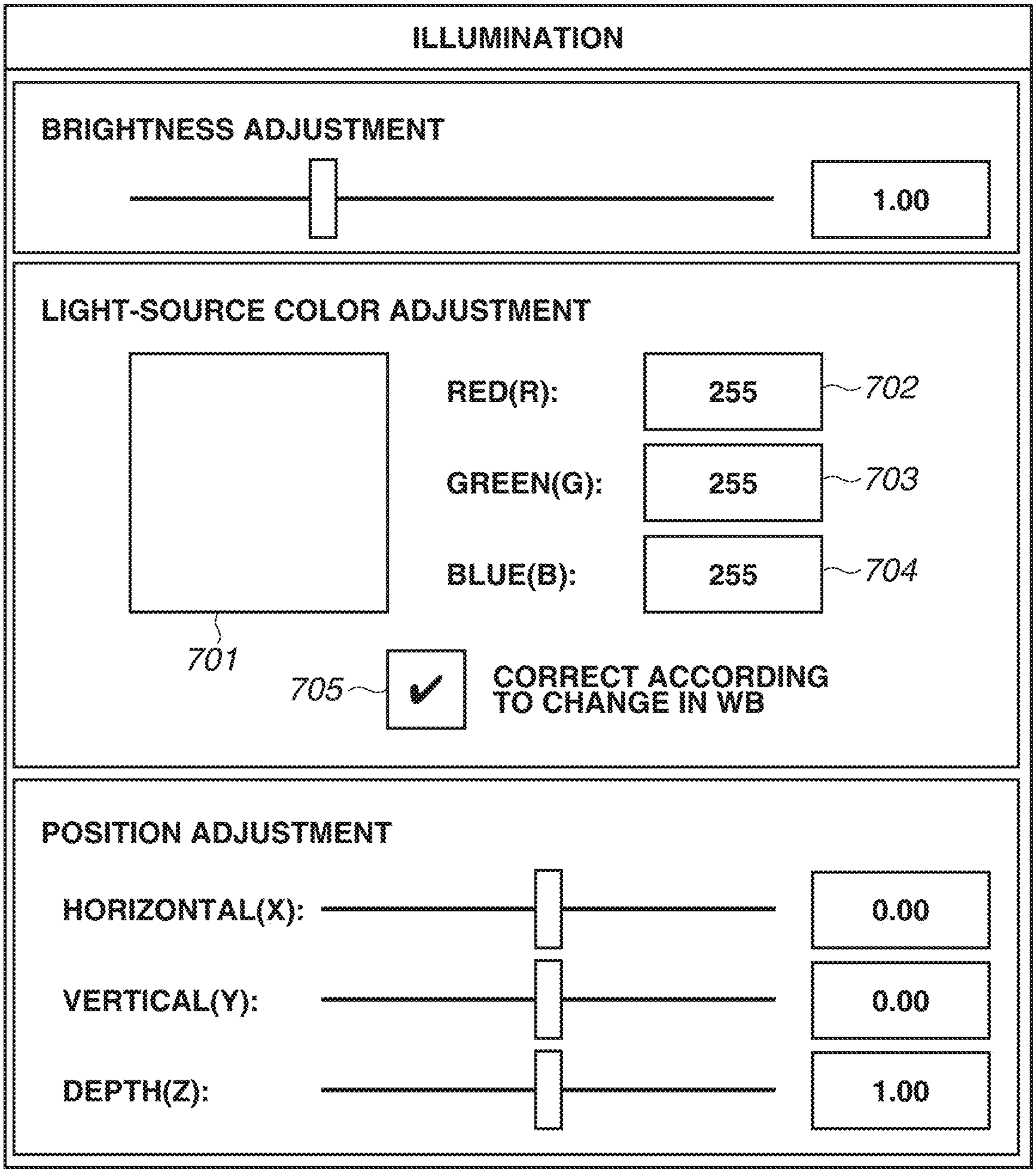
FIG. 7 illustrates an example of an illumination parameter setting screen.

In step S403, the illumination parameter setting unit 304 sets the illumination parameters based on the information according to the user operation acquired from the control unit 205. FIG. 7 illustrates an example of an illumination parameter setting screen according to the present exemplary embodiment. In the present exemplary embodiment, the brightness, the light-source color, and the positional information of the illumination are set based on the user operation as the illumination parameters. Each of the illumination parameters is set based on a numerical value input based on the user operation. For example, light-source color parameters L are set based on values input in gloss color input regions 702 to 704 on the illumination parameter setting screen. More specifically, each of the values input in the gloss color input regions 702 to 704 is divided by 255, and is used as a value ranging from 0 to 1. A color corresponding to the input RGB values is displayed in a light-source color display region 701 to be presented to the user. In the setting screen, a check box 705 is provided. The illumination parameter correction unit 306 corrects the light-source color parameters by the illumination parameter correction processing, which will be described below, when the check box 705 is checked. In the present exemplary embodiment, the check box 705 is permitted to be checked when the gloss is added. When the light-source color parameters included in the illumination parameters are updated, the RGB values and the color displayed in the light-source color display region 701 on the illumination parameter setting screen are updated according to the updated light-source color parameters.

In step S404, the development processing unit 302 generates the color image data by performing the development processing on the RAW image data acquired from the RAM 203 based on the development parameters set by the development parameter setting unit 301. In the present exemplary embodiment, the development processing unit 302 generates color image data I storing therein the RGB values as the pixel values in each pixel by performing the noise reduction processing and the demosaic processing on the RAW image data. The development processing unit 302 then generates color image data I' in which a color tone is corrected based on the white balance values included in the development parameters and the color image data I as indicated by formula (1):

$$I'_r(i,j)=WB_r \cdot I_r(i,j)$$

$$I'_g(i,j)=WB_g \cdot I_g(i,j)$$

$$I'_b((i,j)=WB_b \cdot I_b(i,j) \quad (1),$$

where $WB_r$, $WB_g$, and $WB_b$ are the white balance values of R, G, and B, respectively.

In step S405, the illumination parameter correction unit 306 corrects the light-source color parameters included in the illumination parameters set by the illumination parameter setting unit 304 based on the development parameters set by the development parameter setting unit 301. The details of the processing for correcting the light-source color parameters will be described below.

In step S406, the gloss component generation unit 307 generates the gloss component image data from the distance image data and the normal image data based on the illumination parameters corrected by the illumination parameter correction unit 306. The details of the gloss component generation processing for generating the gloss component image data will be described below.

In step S407, the gloss component addition unit 308 combines the color image data acquired from the development processing unit 302 and the gloss component image data generated by the gloss component generation unit 307, thereby generating the corrected image data in which the glossy appearance is corrected. In the present exemplary embodiment, corrected image data J is generated by adding the color image data I' and the gloss component image data S' according to formula (2):

$$J_r(i,j)=I'_r(i,j)+S'_r(i,j)$$

$$J_g(i,j)=I'_g(i,j)+S'_g(i,j)$$

$$J_b(i,j)=I'_b(i,j)+S'_b(i,j) \quad (2),$$

where $J_r$, $J_g$, and $J_b$ are the pixel values of R, G, and B in the corrected image data J, respectively. $S_r'$, $S_g'$, and $S_b'$ are the pixel values of R, G, and B in the gloss component image data S', respectively.

Figure 8:
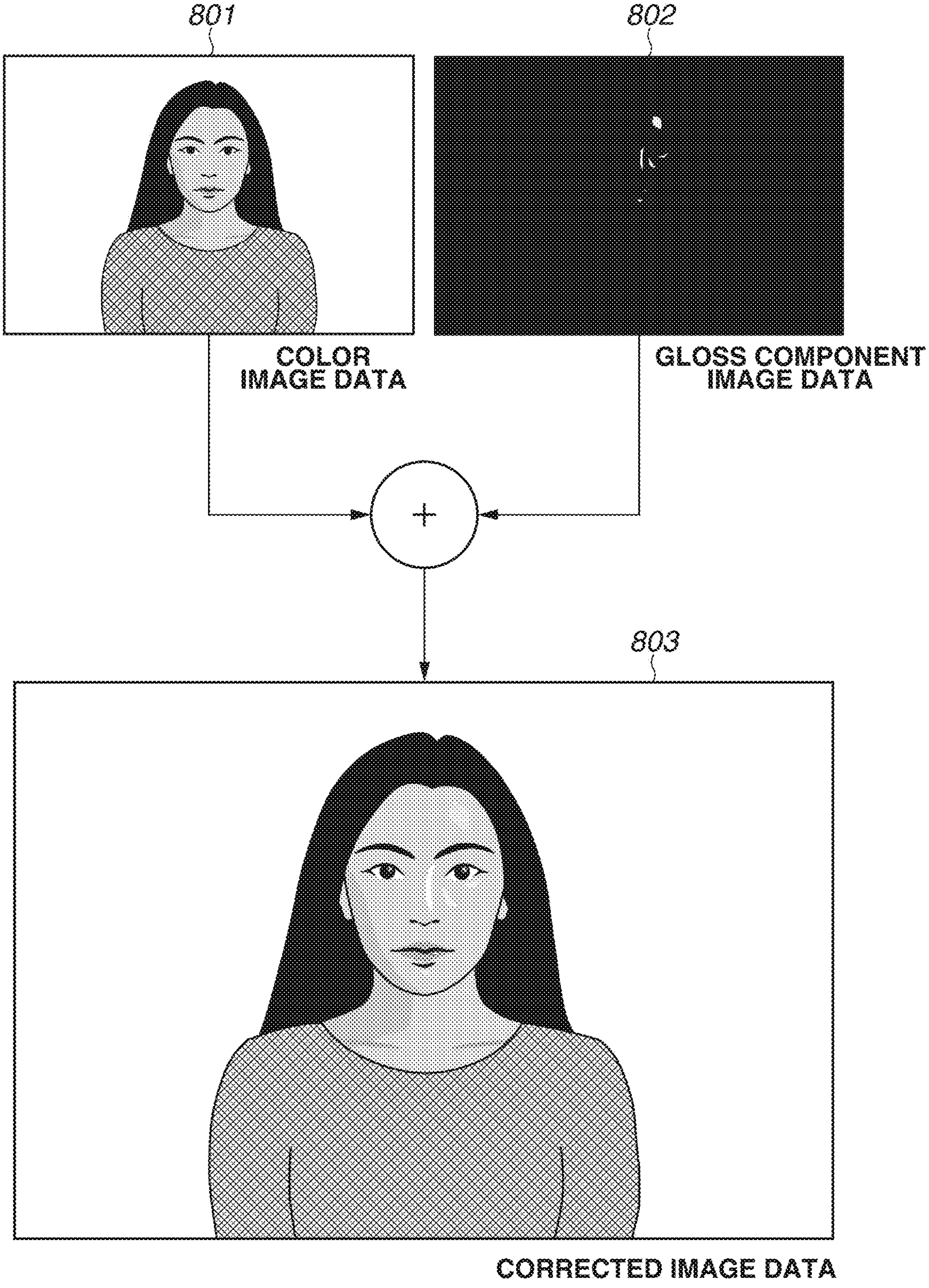
FIG. 8 illustrates gloss component addition processing.

FIG. 8 illustrates an example of the corrected image data generated by the gloss component addition processing in step S407. Corrected image data J 803 is generated by adding color image data I' 801 and gloss component image data S' 802. After the generation, the corrected image data may be subjected to color processing and converted into a predetermined color space.

In step S408, the image processing unit 208 outputs the corrected image data generated in step S407 to the display unit 106, thereby displaying the corrected image data on the display unit 106.

In step S409, the image processing unit 208 determines whether to end the lighting correction processing based on information according to a user operation acquired from the control unit 205. If the image processing unit 208 determines to end the lighting correction processing (YES in step S409), the processing proceeds to step S410. If the image processing unit 208 determines not to end the lighting correction processing (NO in step S409), the processing proceeds to step S402. In step S402, the image processing unit 208 sets the development parameters again.

In step S410, the image processing unit 208 outputs and stores the corrected image data generated in step S407 in the PC/medium 213. The image processing unit 208 then ends the lighting correction processing illustrated in FIG. 4. The image processing unit 208 may output and store the color image data, the distance image data, the normal image data, the gloss component image data, and/or other data in the PC/medium 213 in association with the corrected image data. The processing order illustrated in FIG. 4 is an example, and is not limited thereto. A parameter, image data, and the like required for each processing are to be acquired before the processing is performed. For example, the processing for setting the development parameters performed in step S402 is to be performed at a different timing as long as it is performed before the development processing in step S404 is performed. The processing for setting the illumination parameters performed in step S403 is to be performed at a different timing as long as it is performed before the illumination parameter correction processing in step S405 is performed.

<Normal Image Generation Processing>

The normal image generation processing performed by the normal generation unit 303 in step S401 illustrated in FIG. 4 will now be described. In the normal image generation processing according to the present exemplary embodiment, the normal image data is acquired based on the distance image data. The normal generation unit 303 calculates three-dimensional coordinate values for each pixel based on two-dimensional coordinate values of each pixel and the distance value stored in each pixel in the distance image data. The normal generation unit 303 then calculates a corresponding normal vector for each pixel based on the three-dimensional coordinate values.

Examples of the method for calculating the normal vector include the following methods: a method using three-dimensional coordinate values of the target pixel and neighboring pixels thereof and calculating the normal vector based on a gradient calculated from the three-dimensional coordinate values, and a method applying a plane to each pixel and calculating a perpendicular line on this plane as the normal vector. In the present exemplary embodiment, the latter method above (the method of applying the plane to each pixel) is used to calculate the normal vector as an example.

The procedure for calculating the normal vector will be described in detail below. $(x_0, y_0, z_0), \ldots, (x_{n-1}, y_{n-1}, z_{n-1})$ are defined to represent three-dimensional coordinate values of a pixel targeted for the calculation of the normal vector and pixels located near the targeted pixel. An x coordinate value is acquired based on a horizontal coordinate value of a two-dimensional coordinate value. A y coordinate value is acquired based on a vertical coordinate value of the two-dimensional coordinate value. The z coordinate value is acquired based on the distance value. The normal generation unit 303 applies a plane ax+by+c=z to these coordinate values, and calculates a, b, and c that minimize a function E indicated by the following formula (3):

$$E=\Sigma_i(ax_i+by_i+c-z_i)^2 \quad (3).$$

In formula (3), a, b, and c can be calculated using the following formula (4):

$$\begin{bmatrix} a \\ b \\ c \end{bmatrix} = \begin{bmatrix} \sum_i x_i^2 & \sum_i x_i y_i & \sum_i x_i \\ \sum_i x_i y_i & \sum_i x_i^2 & \sum_i y_i \\ \sum_i x_i & \sum_i y_i & n \end{bmatrix}^{-1} \begin{bmatrix} \sum_i x_i z_i \\ \sum_i y_i z_i \\ \sum_i z_i \end{bmatrix}, \quad (4)$$

where i indicated in these formulae represents an index value of the pixel.

A vector $N=(N_x, N_y, N_z)$ perpendicular to the plane ax+by+c=z can be calculated from the following formua (5) using the acquired values of a and b:

$$N_x = \frac{a}{\sqrt{a^2+b^2+1}} \quad (5)$$

-continued $$N_y = \frac{b}{\sqrt{a^2 + b^2 + 1}}$$

$$N_z = -\frac{-1}{\sqrt{a^2 + b^2 + 1}}.$$

As described above, the normal generation unit 303 calculates the normal vector at the target pixel. The normal generation unit 303 generates the normal image data by performing similar processing on each pixel in the image data to calculate the normal vector. In other words, the normal image data is indicated as image data storing therein the normal vector ($N_x$(i, j), $N_y$(i, j), $N_z$(i, j)) in the pixel I(i, j). The normal generation unit 303 generates the normal image data by above-described processing.

<Illumination Parameter Correction Processing>

Figure 9:
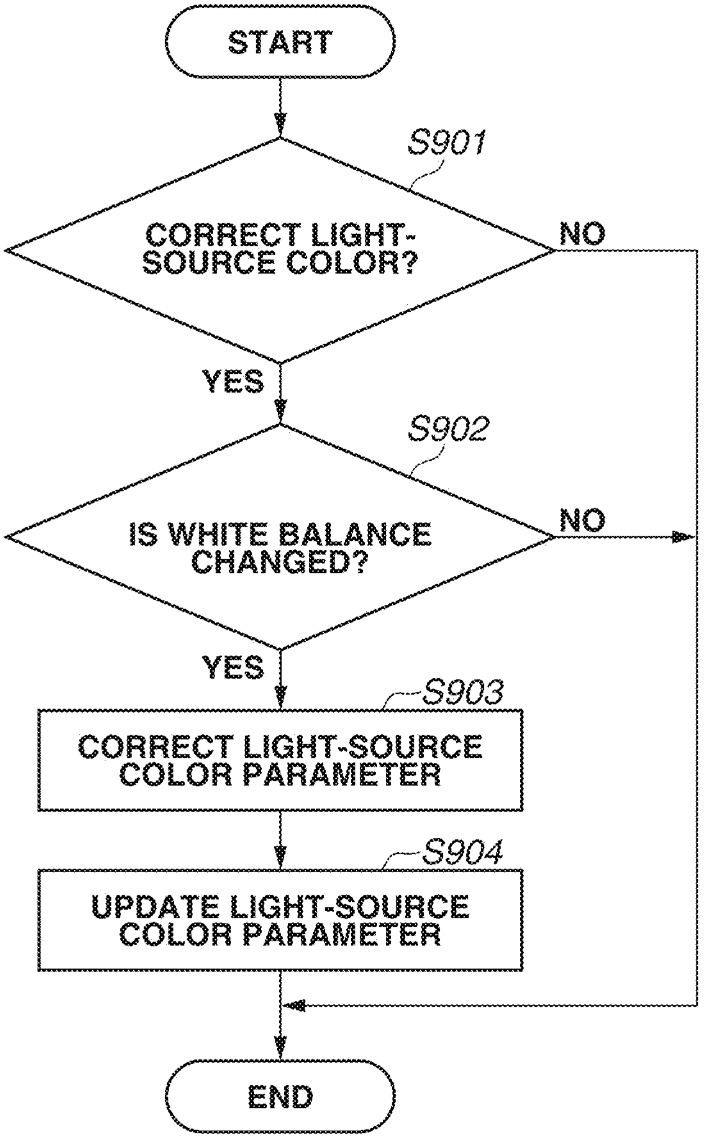
FIG. 9 is a flowchart illustrating an example of illumination parameter correction processing according to the first exemplary embodiment.

The illumination parameter correction processing performed by the illumination parameter correction unit 306 in step S405 illustrated in FIG. 4 will now be described. FIG. 9 is a flowchart illustrating an example of the illumination parameter correction processing according to the present exemplary embodiment. In the illumination parameter correction processing according to the present exemplary embodiment, the light-source color parameters included in the illumination parameters are corrected based on change amounts of the white balance values included in the development parameters.

In step S901, the illumination parameter correction unit 306 determines whether to correct the light-source color. The illumination parameter correction unit 306 makes the determination based on the state of the check box 705 on the illumination parameter setting screen. If the check box 705 is checked and the illumination parameter correction unit 306 determines to correct the light-source color (YES in step S901), the processing proceeds to step S902. In step S902, the illumination parameter correction unit 306 corrects the light-source color parameters. If the check box 705 is not checked and the illumination parameter correction unit 306 determines not to correct the light-source color (NO in step S901), the illumination parameter correction unit 306 ends the illumination parameter correction processing without correcting the light-source color parameters.

In step S902, the illumination parameter correction unit 306 determines whether the white balance values included in the development parameters are changed. If the illumination parameter correction unit 306 determines that the white balance values are changed (YES in step S902), the processing proceeds to step S903. If the illumination parameter correction unit 306 determines that the white balance values are not changed (NO in step S902), the illumination parameter correction unit 306 ends the illumination parameter correction processing without correcting the light-source color parameters.

In step S903, the illumination parameter correction unit 306 corrects the light-source color parameters included in the illumination parameters based on the change amounts of the white balance values included in the development parameters. In the present exemplary embodiment, the illumination parameter correction unit 306 corrects the light-source color parameters L according to the following formula (6):

$$L'_r = \frac{WB'_r}{WB_r} L_r \qquad (6)$$

$$L'_q = \frac{WB'_g}{WB_g} L_g$$

$$L'_b = \frac{WB'_b}{WB_b} L_b,$$

where $L_r$, $L_g$, and $L_b$ are the light-source color parameters of R, G, and B before the correction, respectively. $L_r'$, $L_g'$, and $L_b'$ are the light-source color parameters of R, G, and B after the correction. $WB_r$, $WB_g$, and $WB_b$ are the white balance values of R, G, and B before the change. $WB_r'$, $WB_g'$, and $WB_b'$ are the white balance values of R, G, and B after the change.

The color tone of the gloss component can be corrected in conformity with the change in the white balance by correcting the light-source color parameters according to the processing described above.

In step S904, the illumination parameter correction unit 306 updates the light-source color parameters. The illumination parameter correction unit 306 updates the light-source color parameters L into a corrected light-source color parameters L's. The illumination parameter correction unit 306 then updates the values, which are displayed in the gloss color input regions 702 to 704 on the illumination parameter setting screen, and the color, which is displayed in the light-source color display region 701 on the illumination parameter setting screen, based on the corrected light-source color parameters L'. By performing the processing described above, the illumination parameter correction unit 306 corrects the light-source color parameters included in the illumination parameters.

<Gloss Component Generation Processing>

Figure 10A:
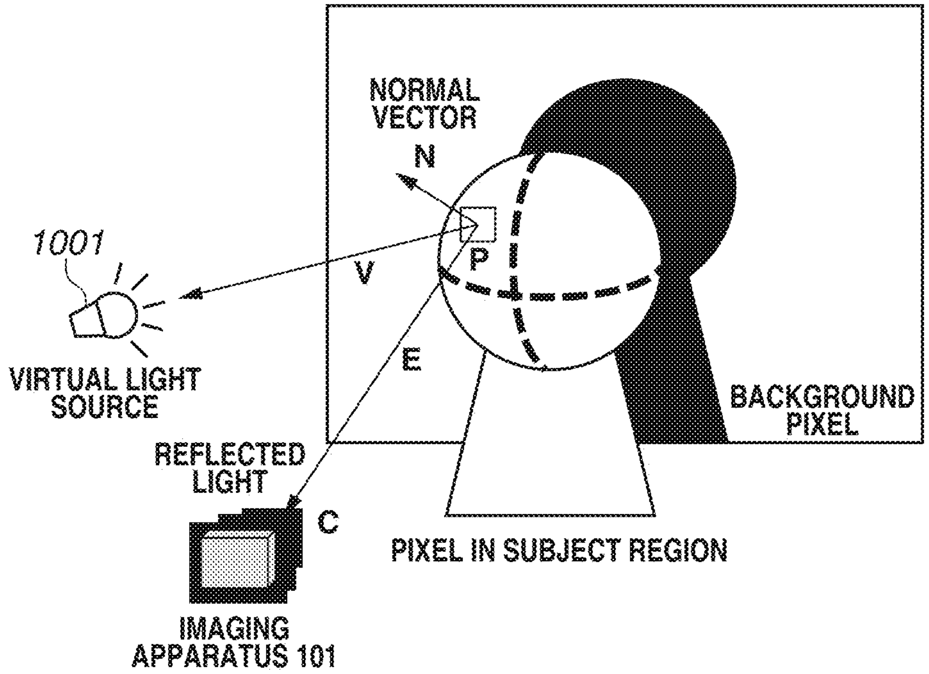
FIGS. 10A and 10B illustrate gloss component generation processing.
Figure 10B:
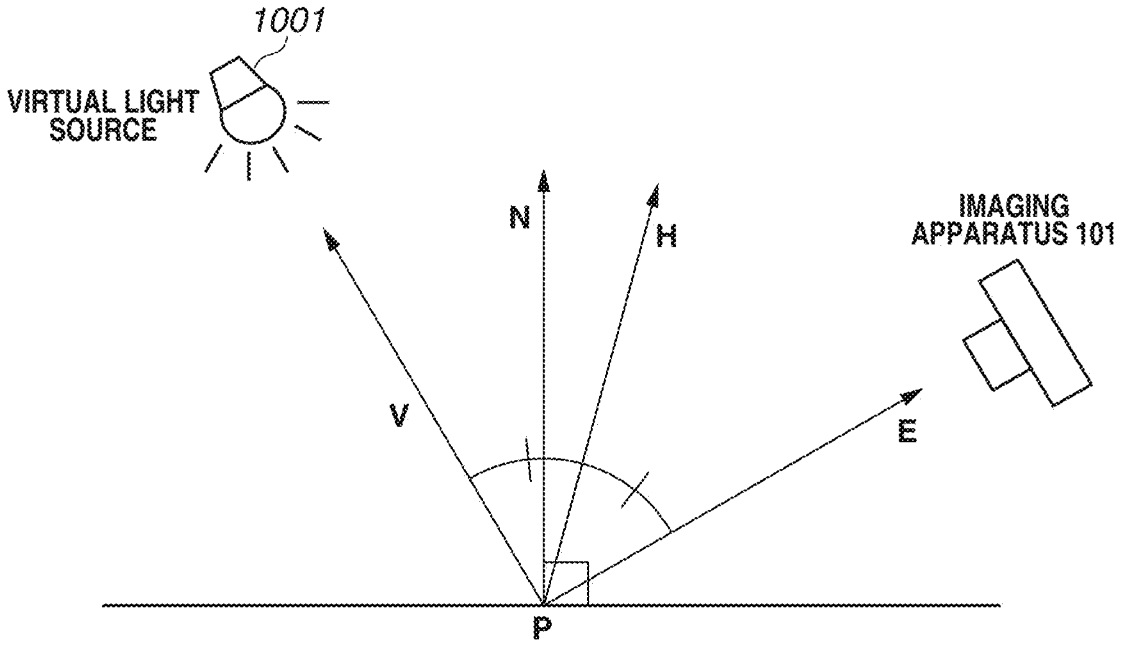

The gloss component generation processing performed by the gloss component generation unit 307 in step S406 illustrated in FIG. 4 will now be described. In the gloss component generation processing according to the present exemplary embodiment, the gloss component image data is generated by adding a virtual light source as virtual illumination to the color image data according to the illumination parameters set through the user operation, based on the distance image data and the normal image data. An intensity of a gloss based on the virtual illumination can be calculated according to, for example, the Blinn-Phong model or the Torrance-Sparrow model indicating an existing specular reflection. In the present exemplary embodiment, the gloss component generation unit 307 generates gloss intensity image data S according to the following formula (7) based on a position and an intensity α of the virtual illumination included in the illumination parameters:

$$S(i,j)=\alpha\beta(H(i,j)\cdot N(i,j))^c \qquad (7),$$

where β is a specular reflectivity, and c is a parameter indicating how the gloss spreads. Regarding the parameter c, the gloss becomes sharper as the value of the parameter c increases, and the gloss becomes softer as the value of the parameter c reduces. H is a half vector acquired by normalizing an average vector of a unit vector V extending from a position P of the pixel (i, j) toward a virtual light source (virtual illumination) 1001 and a unit vector E extending from the position P to a position C corresponding to the imaging apparatus 101 into 1 as illustrated in FIGS. 10A and 10B.

The gloss component generation unit 307 generates the gloss component image data S' according to the following formula (8) based on the gloss intensity image data S and the light-source color parameters L':

$$S'_r(i,j)=S(i,j)L'_r$$

$$S'_g(i,j)=S(i,j)L'_g$$

$$S'_b(i,j)=S(i,j)L'_b \quad (8),$$

where $S_r'$, $S_g'$, and $S_b'$ are the values of the R, G, and B components, respectively. The $S_r'$, $S_g'$, and $S_b'$ are pixel values of the gloss component image data S'.

Through above-described processing, the gloss component generation unit 307 generates the gloss component image data according to the subject in the color image data.

In the present exemplary embodiment, the gloss component image data is generated based on the distance image data, the normal image data, and the illumination parameters. However, the method for generating the gloss component image data is not limited thereto. For example, the gloss component generation unit 307 may acquire the gloss intensity image data stored in the PC/medium 213 or the like in advance, and generate the gloss component image data based on the acquired gloss intensity image data. Alternatively, the gloss component generation unit 307 may generate the gloss intensity image data according to painting work based on a user operation, and generate the gloss component image data based on the generated gloss intensity image data.

In the present exemplary embodiment, whether to correct the light-source color is determined according to the state of the check box 705 in step S901 illustrated in FIG. 9. However, the determination method is not limited thereto. For example, the illumination parameter correction unit 306 may determine whether the gloss is added to the subject, and perform the correction processing when the gloss is added.

<Processing Procedure when the Order of the White Balance Processing is Changed>

In the above description, the gloss component image data is added to the color image data after the white balance processing. However, the processing order is not limited thereto. The processing order may be set in such a manner that the gloss component image data is added to the color image data before the white balance processing, and thereafter the white balance processing is performed. In the following description, the processing procedure in this case will be described focusing on a difference from the above-described operation of the image processing unit 208 according to the flowchart illustrated in FIG. 4. More specifically, the processing performed in steps S404 to S407 illustrated in FIG. 4 is different.

The processing in steps S401 to S403 is similar to the above-described processing.

In step S404, the development processing unit 302 generates the color image data I storing therein the RGB values as the pixel values in each pixel by performing the noise reduction processing and the demosaic processing on the RAW image data. The white balance processing is not performed in the processing in this step S404 but in the later step of S407.

In step S405, the illumination parameter correction unit 306 corrects the light-source color parameters based on the development parameters. At this time, the processing is performed according to the flowchart illustrated in FIG. 9, but the processing in steps S903 and S904 is different. In step S903, the illumination parameter correction unit 306 corrects the light-source color parameters L according to the following formula (9):

$$L''_r = \frac{1}{WB_r}L_r \quad (9)$$

$$L''_g = \frac{1}{WB_g}L_g$$

$$L''_b = \frac{1}{WB_b}L_b,$$

where $L_r''$, $L_g''$, and $L_b''$ represent the light-source color parameters of R, G, and B after the correction, respectively.

$L_r''$, $L_g''$, and $L_b''$ are not used in the processing in the subsequent step of S904, but are used in the processing in step S406. In step S904, the illumination parameter correction unit 306 updates the illumination parameters. The illumination parameter correction unit 306 updates the light-source color parameters L according to the above-described formula (6). The illumination parameter correction unit 306 then updates the light-source color parameters L into the corrected light-source color parameters L', and updates the values displayed in the gloss color input regions 702 to 704 and the color displayed in the light-source color display region 701 on the illumination parameter setting screen, based on the corrected light-source color parameters L'.

In step S406, the gloss component generation unit 307 generates the gloss component image data from the distance image data and the normal image data, based on the illumination parameters corrected by the illumination parameter correction unit 306. The gloss component generation unit 307 generates the gloss intensity image data S according to the above-described formula (7). The gloss component generation unit 307 then generates gloss component image data S" according to the following formula (10) based on the gloss intensity image data S and the light-source color parameters L":

$$S''_r(i,j)=S(i,j)\cdot L''_r$$

$$S''_g(i,j)=S(i,j)\cdot L''_g$$

$$S''_b(i,j)=S(i,j)\cdot L''_b \quad (10),$$

where $S_r''$, $S_g''$, and $S_b''$ are the pixel values in the gloss component image data S" indicating the values of the R, G, and B components, respectively.

Based on the processing described above, the gloss component generation unit 307 generates the gloss component image data according to the subject in the color image data.

In step S407, the gloss component addition unit 308 subsequently combines the color image data and the gloss component image data, thereby generating the corrected image data in which the glossy appearance is corrected. At this time, the white balance processing is also performed along therewith. In this case, the gloss component addition unit 308 generates the corrected image data J according to formula (11):

$$J_r(i,j)=WB'_r(I_r(i,j)+S''_r(i,j))$$

$$J_g(i,j)=WB'_g(I_r(i,j)+S''_g(i,j))$$

$$J_b(i,j)=WB'_r(I_b(i,j)+S''_b(i, j)) \quad (11).$$

By performing above-described processing, similar advantageous effects can be obtained even when the processing order is changed.

According to the present exemplary embodiment as described above, the three-dimensional appearance of the subject in the captured image can be corrected without causing a feeling of strangeness even when the color tone of the captured image is changed, by correcting the color of the added gloss component according to the change in the white balance with respect to the captured image.

In the above-described first exemplary embodiment, the image processing unit 208 corrects the illumination parameters (the light-source color parameters) based on the change amounts of the white balance values. In a second exemplary embodiment described below, the image processing unit 208 corrects the illumination parameters (the light-source color parameters) based on the white balance values and a color of a high-luminance region in the color image data. The subject corresponding to the gloss component having the same color as the light-source color is mainly targeted in the above-described first exemplary embodiment. However, the color of the gloss component may be different from the light-source color due to the reflection characteristic of the subject. The present exemplary embodiment allows the three-dimensional appearance of the subject in the captured image to be corrected without causing a feeling of strangeness even when a subject having a different reflection characteristic is contained in the captured image.

The configurations of the image processing apparatus (e.g., the image processing unit 208) according to the present exemplary embodiment and the imaging apparatus including it, and the like are similar to the first exemplary embodiment, and thus the descriptions thereof will be omitted here. Operations performed in the image processing unit 208 according to the present exemplary embodiment will be described below.

<Operation of Image Processing Unit According to Second Exemplary Embodiment>

Figure 11:
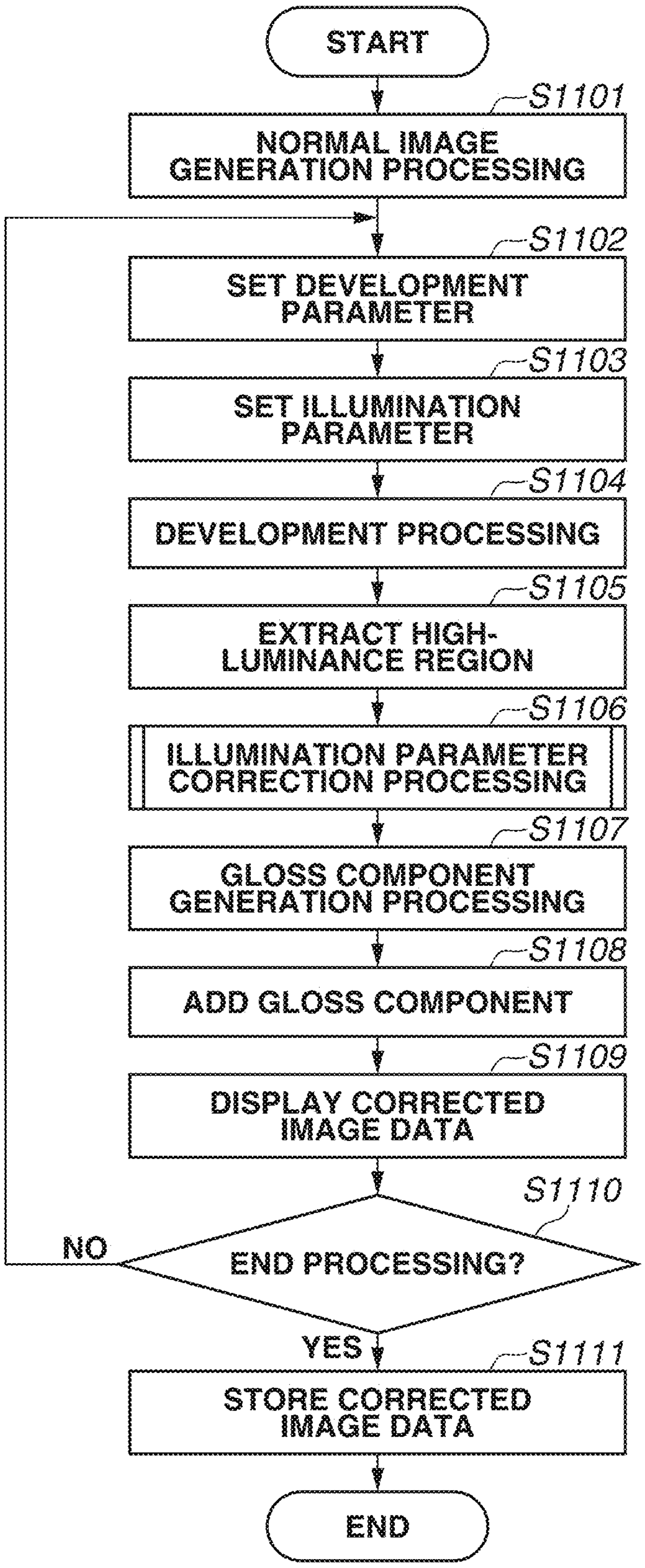
FIG. 11 is a flowchart illustrating an example of processing performed by an image processing unit according to a second exemplary embodiment.

FIG. 11 is a flowchart illustrating an example of processing performed by the image processing unit 208 according to the present exemplary embodiment. FIG. 11 illustrates an example of lighting correction processing.

The processing in steps S1101 to S1104 is similar to the processing in steps S401 to S404 illustrated in FIG. 4 in the first exemplary embodiment.

In step S1101, the normal generation unit 303 generates the normal image data corresponding to the color image data based on the distance image data acquired from the RAM 203.

In step S1102, the development parameter setting unit 301 sets the development parameters based on the imaging information contained in the RAW image data acquired from the RAM 203 and the information according to the user operation acquired from the control unit 205.

In step S1103, the illumination parameter setting unit 304 sets the illumination parameters based on the information according to the user operation acquired from the control unit 205.

In step S1104, the development processing unit 302 generates the color image data by performing the development processing on the RAW image data acquired from the RAM 203, based on the development parameters set by the development parameter setting unit 301.

In step S1105, the high-luminance region extraction unit 305 extracts a pixel having a high luminance value in the color image data acquired from the development processing unit 302 as a high-luminance region. The high-luminance region extraction unit 305 calculates a luminance value Y of each pixel based on the RGB values of each pixel in the color image data. The high-luminance region extraction unit 305 then performs binarization processing with respect to each pixel using a threshold value Yth, and extracts a group of pixels having luminance values Y equal to or higher than the threshold value Yth as the high-luminance region. The threshold value Yth is set based on a histogram of the luminance value Y in the color image data. For example, a luminance value corresponding to top n % in the entire color image data is set as the threshold value Yth. The method for extracting the high-luminance region is not limited thereto. For example, the threshold value Yth may be determined based on a user operation. The extraction of the high-luminance region may additionally include correction processing of adding or removing a region based on a user operation to or from the high-luminance region extracted based on the threshold value Yth.

In step S1106, the illumination parameter correction unit 306 corrects the light-source color parameters, based on the development parameters set by the development parameter setting unit 301 and the high-luminance region in the color image data extracted by the high-luminance region extraction unit 305. Details of the processing for correcting the light-source color parameters will be described below.

In step S1107, the gloss component generation unit 307 generates the gloss component image data from the distance image data and the normal image data, based on the illumination parameters corrected by the illumination parameter correction unit 306. The gloss component generation unit 307 generates the gloss intensity image data S according to the above-described formula (7). The gloss component generation unit 307 then generates the gloss component image data S' according to the following formula (12), based on the gloss intensity image data S and the light-source color parameters M' corrected in step S1106:

$$S'_r(i,j)=S(i,j)M'_r$$

$$S'_g(i,j)=S(i,j)M'_g$$

$$S'_b(i,j)=S(i,j)M'_b \quad (12),$$

where $M_r'$, $M_g'$, and $M_b'$ are the light-source color parameters of R, G, and B after the correction based on the color information of the high-luminance region, respectively.

By performing above-described processing, the gloss component generation unit 307 generates the gloss component image data according to the subject in the color image data.

The processing performed in steps S1108 to S1111 is similar to the processing performed in steps S407 to S410 illustrated in FIG. 4 in the first exemplary embodiment.

In step S1108, the gloss component addition unit 308 combines the color image data acquired from the development processing unit 302 and the gloss component image data generated by the gloss component generation unit 307, thereby generating the corrected image data in which the glossy appearance is corrected.

In step S1109, the image processing unit 208 displays the corrected image data by outputting the corrected image data generated in step S1108 to the display unit 106.

In step S1110, the image processing unit 208 determines whether to end the lighting correction processing based on the information according to the user operation acquired from the control unit 205. If the image processing unit 208 determines to end the lighting correction processing (YES in step S1110), the processing proceeds to step S1111. If the image processing unit 208 determines not to end the lighting correction processing (NO in step S1110), the processing proceeds to step S1102.

In step S1111, the image processing unit 208 outputs and stores the corrected image data generated in step S1108 into the PC/medium 213, and ends the above-described lighting correction processing. The image processing unit 208 may operate so as to output and store the color image data, the distance image data, the normal image data, the gloss component image data, and/or the like into the PC/medium 213 in association with the corrected image data. The processing order illustrated in FIG. 11 is an example, and is not limited thereto. The processing order may be set in a different manner as long as the parameter, the image, and the like required for the processing can be acquired before the processing is performed.

<Illumination Parameter Correction Processing According to the Present Exemplary Embodiment>

Figure 12:
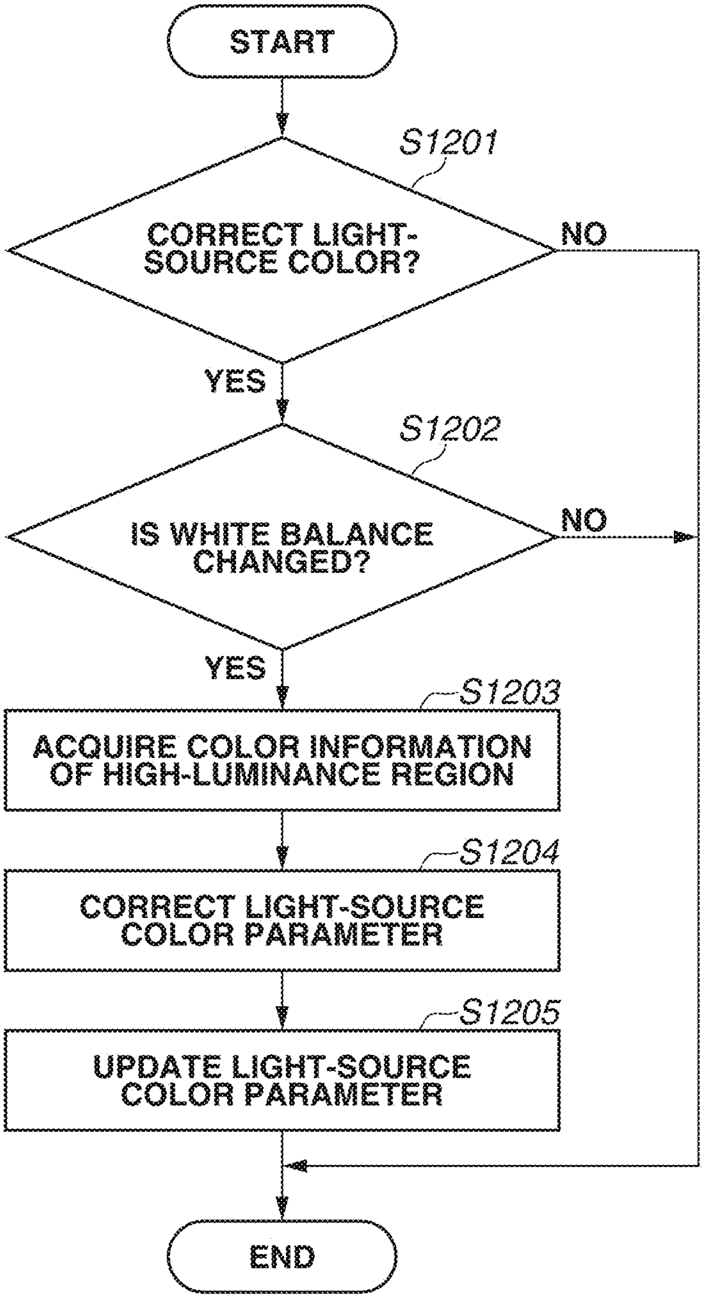
FIG. 12 is a flowchart illustrating an example of illumination parameter correction processing according to the second exemplary embodiment.

The illumination parameter correction processing performed by the illumination parameter correction unit 306 in step S1106 illustrated in FIG. 11 will now be described. In the illumination parameter correction processing according to the present exemplary embodiment, the light-source color parameters included in the illumination parameters are corrected based on the change amounts of the white balance values included in the development parameters and the color information of the high-luminance region in the color image data. FIG. 12 is a flowchart illustrating an example of the illumination parameter correction processing according to the present exemplary embodiment.

In step S1201, the illumination parameter correction unit 306 determines whether to correct the light-source color in a similar manner to the first exemplary embodiment. If the illumination parameter correction unit 306 determines to correct the light-source color (YES in step S1201), the processing proceeds to step S1202. If the illumination parameter correction unit 306 determines not to correct the light-source color (NO in step S1201), the illumination parameter correction unit 306 ends the illumination parameter correction processing without correcting the light-source color parameters.

In step S1202, the illumination parameter correction unit 306 determines whether the white balance values included in the development parameters are changed. If the illumination parameter correction unit 306 determines that the white balance values are changed (YES in step S1202), the processing proceeds to step S1203. If the illumination parameter correction unit 306 determines that the white balance values are not changed (NO in step S1202), the illumination parameter correction unit 306 ends the illumination parameter correction processing without correcting the light-source color parameters.

In step S1203, the illumination parameter correction unit 306 acquires the color information of the high-luminance region in the color image data. The illumination parameter correction unit 306 extracts the pixel values of the high-luminance region from the color image data and averages the extracted pixel values of the high-luminance region, thereby setting this average value as color information H' of the high-luminance region.

In step S1204, the illumination parameter correction unit 306 corrects the light-source color parameters included in the illumination parameters, based on the change amounts of the white balance values included in the development parameters and the color information of the high-luminance region in the color image data. In the present exemplary embodiment, the illumination parameter correction unit 306 acquires the corrected light-source color parameters L', by correcting the light-source color parameters L based on the change amounts of the white balance values according to the above-described formula (6). The illumination parameter correction unit 306 corrects the light-source color parameters by also using the color information H' of the high-luminance region according to the following formula (13):

$$M'_r = wH'_r + (1-w)L'_r$$

$$M'_g = wH'_g + (1-w)L'_g$$

$$M'_b = wH'_b + (1-w)L'_b \quad (13),$$

where $H_r'$, $H_g'$, and $H_b'$each represent the color information of the high-luminance region. W is a weight assigned to the color information of the high-luminance region, and has a value ranging from 0 to 1.

An increase in the value of the weight w means that priority is placed on the use of the color information of the high-luminance information, thereby making the color of the added gloss closer to the color of the high-luminance region. In the present exemplary embodiment, a different value is set as the weight w for each region in the color image based on a user operation.

In step S1205, the illumination parameter correction unit 306 updates the light-source color parameters. The illumination parameter correction unit 306 updates the light-source color parameters L before the correction into the corrected light-source color parameters M' that have been corrected based on the change amounts of the white balance values and the color information of the high-luminance region in the color image data. The illumination parameter correction unit 306 then updates the values displayed in the gloss color input regions 702 to 704 and the color displayed in the light-source color display region 701 on the illumination parameter setting screen, based on the corrected light-source color parameters M'. By performing the processing described above, the illumination parameter correction unit 306 corrects the light-source color parameters included in the illumination parameters.

In the present exemplary embodiment, the weight w assigned to the color information of the high-luminance region is set based on the user operation. However, the setting method is not limited thereto. The weight w may be set based on a result of performing object detection processing or object recognition processing on the content of the color image. For example, the weight w may be set to a small value for a region recognized as skin, and the weight w may be set to a large value for a region recognized as metal. Consequently, the gloss on the skin and the gloss on the metal each can be corrected without causing a feeling of strangeness.

In the present exemplary embodiment, the color information of the high-luminance region is acquired in step S1203. However, the color information may be acquired from a region corresponding to a great weight w among high-luminance regions at this time. Consequently, the correction can be made with the color information of the high-luminance region acquired from a region corresponding to a gloss component having a different color from the light-source color.

<Processing Procedure when the Order of the White Balance Processing is Changed According to the Present Exemplary Embodiment>

In the above description, the gloss component image data is added to the color image data after the white balance processing is performed. However, the processing order is not limited thereto. The gloss component image data may be added to the color image data before the white balance processing is performed. The white balance processing is preformed afterwards. The processing procedure in this case will be described focusing on a difference from the above-described operation performed by the image processing unit 208 with reference to the flowchart illustrated in FIG. 11. More specifically, the processing performed in steps S1104 and S1106 to S1108 illustrated in FIG. 11 is different.

The processing performed in steps S1101 to S1103 is similar to the above-described processing.

In step S1104, the development processing unit 302 generates the color image data I storing therein the RGB values as the pixel values in each pixel by performing the noise reduction processing and the demosaic processing on the RAW image data.

The processing performed in step S1105 is similar to the above-described processing.

In step S1106, the illumination parameter correction unit 306 corrects the light-source color parameters based on the development parameters and the color information of the high-luminance region in the color image data. In this case, the processing is performed according to the flowchart illustrated in FIG. 12 but the processing in steps S1204 and S1205 is different. In step S1204, the illumination parameter correction unit 306 acquires the light-source color parameters L" by correcting the light-source color parameters L based on the white balance values according to the above-described formula (9). The illumination parameter correction unit 306 then corrects the light-source color parameters L" based on the color information of the high-luminance region according to the following formula (14):

$$M_r = wH_r + (1-w)L''_r$$

$$M_g = wH_g + (1-w)L''_g$$

$$M_b = wH_b + (1-w)''_b \quad (14),$$

where $M_r$, $M_g$, and $M_b$ are the light-source color parameters of R, G, and B after the correction, respectively.

These light-source color parameters $M_r$, $M_g$, and $M_b$ are not used in the processing in step S1205 subsequent thereto but are used in the processing in step S1107. In step S1205, the illumination parameter correction unit 306 updates the illumination parameters. The illumination parameter correction unit 306 corrects the light-source color parameters L based on the change amounts of the white balance values according to the above-described formula (6), thereby acquiring the corrected light-source color parameters L'. The illumination parameter correction unit 306 then updates the light-source color parameters L into the corrected light-source color parameters L', and updates the values displayed in the gloss color input regions 702 to 704 and the color displayed in the light-source color display region 701 on the illumination parameter setting screen based on the corrected light-source color parameters L'.

In step S1107, the gloss component generation unit 307 generates the gloss component image data from the distance image data and the normal image data based on the illumination parameters corrected by the illumination parameter correction unit 306. The gloss component generation unit 307 generates the gloss intensity image data S according to the above-described formula (7). The gloss component generation unit 307 then generates the gloss component image data S" according to the following formula (15) based on the gloss intensity image data S and the light-source color parameters M:

$$S''_r(i,j) = S_r(i,j) \cdot M_r$$

$$S''_g(i,j) = S_g(i,j) \cdot M_g$$

$$S''_b(i,j) = S_b(i,j) \cdot M_b \quad (15).$$

In step S1108, the gloss component addition unit 308 combines the color image data and the gloss component image data, thereby generating the corrected image data in which the glossy appearance is corrected. At this time, the white balance processing is also performed along therewith. In this case, the gloss component addition unit 308 generates the corrected image data J according to the above-described formula (11). By performing above-described processing, similar advantageous effects can be obtained even when the processing order is changed.

A described above, the color of the added gloss component is corrected based on the change amounts of the white balance values and the color information of the high-luminance region with respect to the captured image, according to the present exemplary embodiment. The three-dimensional appearance of the subject in the captured image can thereby be corrected without causing a feeling of strangeness even when the color tone of the captured image is changed and a subject having a different reflection characteristic is contained in the captured image.

The aspect of the embodiments can also be realized by processing that supplies a program capable of fulfilling one or more functions of the above-described exemplary embodiments to a system or an apparatus via a network or a storage medium, and causes one or more processors in a computer of this system or apparatus to read out and execute the program. The aspect of the embodiments can also be realized by a circuit (e.g., an application specific integrated circuit (ASIC)) capable of fulfilling one or more functions.

Any of the above-described exemplary embodiments merely indicates just one example of how to embody the disclosure when implementing the disclosure, and the technical scope of the disclosure shall not be construed limitedly by them. In other words, the aspect of embodiments can be implemented in various manners without departing from the technical idea thereof or the main features thereof.

According to the above-described exemplary embodiments, the three-dimensional appearance of the subject in the captured image can be corrected without causing a feeling of strangeness even when the color tone of the captured image is changed.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-192719, filed Oct. 23, 2019, which is hereby incorporated by reference herein in its entirety.

What is claimed is:

1. An apparatus comprising:
at least one processor; and
a memory coupled to the at least one processor, the memory having instructions that, when executed by the processor, performs operations as:
a setting unit configured to set a light-source color of a captured image;
a generation unit configured to generate a gloss component on a subject in the captured image using the light-source color corrected according to a color tone of the captured image; and
a first correction unit configured to correct the captured image based on the generated gloss component to the captured image,
wherein the generation unit generates the gloss component based on information including one of a distance image corresponding to the captured image, a normal image generated from the distance image, and information about the corrected light-source color.

2. The apparatus according to claim 1, further comprising a second correction unit configured to correct the set light-source color based on the color tone of the captured image, wherein the second correction unit corrects the set light-source color based on a change amount of the color tone in a case where the color tone of the captured image is changed.

3. The apparatus according to claim 1, wherein the first correction unit corrects the captured image by combining the captured image and the generated gloss component.

4. The apparatus according to claim 1, further comprising an extraction unit configured to extract a high-luminance region having luminance higher than a predetermined threshold value from the captured image,
wherein the first correction unit corrects the set light-source color of the virtual light source based on the color tone and color information of the high-luminance region.

5. The apparatus according to claim 1, further comprising a display unit configured to display the light-source color of the virtual light source.

6. The apparatus according to claim 1, wherein the generation unit can switches to correct the light-source color.

7. A method comprising:
setting a light-source color of a virtual light source;
generating a gloss component on a subject in a captured image using the light-source color corrected according to a color tone of the captured image; and
first correcting the captured image by adding the generated gloss component to the captured image,
wherein the generating generates the gloss component based on information including one of a distance image corresponding to the captured image, a normal image generated from the distance image, and information about the corrected light-source color.

8. The method according to claim 7, further comprising second correcting the set light-source color based on the color tone of the captured image,
wherein the second correcting corrects the set light-source color based on a change amount of the color tone in a case where the color tone of the captured image is changed.

9. The method according to claim 7, wherein the first correcting corrects the captured image by combining the captured image and the generated gloss component.

10. The method according to claim 7, further comprising extracting a high-luminance region having luminance higher than a predetermined threshold value from the captured image,
wherein the first correcting corrects the set light-source color of the virtual light source based on the color tone and color information of the high-luminance region.

11. The method according to claim 7, further comprising displaying the light-source color of the virtual light source.

12. The method according to claim 7, wherein the generating switches to correct the light-source color.

13. A computer-readable non-transitory storage medium storing a program for causing a computer of an apparatus to perform operations comprising:
setting a light-source color of a virtual light source;
generating a gloss component on a subject in a captured image using the light-source color corrected according to a color tone of the captured image; and
first correcting the captured image by adding the generated gloss component to the captured image,
wherein the generating generates the gloss component based on information including one of a distance image corresponding to the captured image, a normal image generated from the distance image, and information about the corrected light-source color.

14. The computer-readable non-transitory storage medium according to claim 13, further comprising second correcting the set light-source color based on the color tone of the captured image,
wherein the second correcting corrects the set light-source color based on a change amount of the color tone in a case where the color tone of the captured image is changed.

15. The computer-readable non-transitory storage medium according to claim 13, wherein the first correcting corrects the captured image by combining the captured image and the generated gloss component.

16. The computer-readable non-transitory storage medium according to claim 13, further comprising extracting a high-luminance region having luminance higher than a predetermined threshold value from the captured image,
wherein the first correcting corrects the set light-source color of the virtual light source based on the color tone and color information of the high-luminance region.

17. The computer-readable non-transitory storage medium according to claim 13, further comprising displaying the light-source color of the virtual light source.

18. The computer-readable non-transitory storage medium according to claim 13, wherein the generating switches to correct the light-source color.

* * * * *